(12) United States Patent
Zanot et al.

(10) Patent No.: US 10,815,688 B2
(45) Date of Patent: Oct. 27, 2020

(54) INTEGRATED SHADE-PROVIDING STRUCTURE AND ELECTRONIC GAME

(71) Applicants: Christopher John Zanot, Carrollton, GA (US); Tommy Lee Rampley, Dallas, GA (US); David Paul Reeves, Mableton, GA (US)

(72) Inventors: Christopher John Zanot, Carrollton, GA (US); Tommy Lee Rampley, Dallas, GA (US); David Paul Reeves, Mableton, GA (US)

(73) Assignee: SUPERIOR INTERNATIONAL INDUSTRIES, INC., Carrollton, GA (US)

( * ) Notice: Subject to any disclaimer, the term of this patent is extended or adjusted under 35 U.S.C. 154(b) by 0 days.

(21) Appl. No.: 16/253,791

(22) Filed: Jan. 22, 2019

(65) Prior Publication Data

US 2020/0232244 A1 Jul. 23, 2020

(51) Int. Cl.
*E04H 15/02* (2006.01)
*E04H 15/32* (2006.01)
(Continued)

(52) U.S. Cl.
CPC .......... *E04H 15/02* (2013.01); *A63F 13/2145* (2014.09); *A63F 13/30* (2014.09);
(Continued)

(58) Field of Classification Search
CPC ......... E04H 15/02; E04H 15/48; E04H 15/32; E04H 15/322; E04H 15/60; A63F 9/24; A63F 13/30; A63F 13/215; A63F 13/2145; A63F 13/322; A63F 13/90; A63F 2300/1075; A63F 2300/1081
USPC ... 135/91, 96, 135, 141–142, 147, 117, 119, 135/120.1; 463/7, 9, 36–37, 40–42, 463/52–53; 446/227, 478, 487, 901;
(Continued)

(56) References Cited

U.S. PATENT DOCUMENTS

| 5,331,992 A * | 7/1994 | Gremont ................. E04H 15/58 135/119 |
| 6,178,978 B1 * | 1/2001 | Rieber .................. E04H 15/006 135/147 |

(Continued)

*Primary Examiner* — Robert Canfield
(74) *Attorney, Agent, or Firm* — McAndrews, Held & Malloy, Ltd.

(57) ABSTRACT

The present disclosure describes a shade-providing structure that includes a framework, a canopy, and an integrated electronic game system. The framework comprises a plurality of uprights, to which is mounted a plurality of elevated support beams. The elevated support beams are coupled to one another by a central hub. In some embodiments, the central hub may define an interior space, in which wiring from the plurality of electronic game units may be easily accessed for installation, repair, and/or to change the operation of the gaming system. The canopy is supported by the elevated support beams to provide a shaded area. The game system includes a plurality of electronic game units mounted to the plurality of uprights. The electronic game units may be operably connected to one another either by wires that extend through the framework or by wireless technology. The electronic game system is preferably configured to stimulate physical play, for instance by encouraging a child to move between the various game units.

17 Claims, 6 Drawing Sheets

(51) Int. Cl.
   *E04H 15/60* (2006.01)
   *A63F 13/2145* (2014.01)
   *A63F 13/90* (2014.01)
   *A63F 13/30* (2014.01)
   *E04H 15/48* (2006.01)
   *A63F 13/215* (2014.01)

(52) U.S. Cl.
   CPC ........... *A63F 13/90* (2014.09); *E04H 15/322* (2013.01); *E04H 15/60* (2013.01); *A63F 13/215* (2014.09); *A63F 2300/1075* (2013.01); *A63F 2300/1081* (2013.01); *E04H 15/48* (2013.01)

(58) Field of Classification Search
   USPC ......................... 381/77; 361/679.05–679.06, 361/679.21–679.23, 679.3; 52/36.2
   See application file for complete search history.

(56) References Cited

U.S. PATENT DOCUMENTS

| | | | | |
|---|---|---|---|---|
| 6,814,094 B1* | 11/2004 | Barber | ................. | E04H 15/322 135/119 |
| 7,025,074 B2* | 4/2006 | Porter | ................. | E04H 15/46 135/119 |
| 7,244,165 B2* | 7/2007 | Gubitosi | ................. | A63H 5/00 297/136 |
| 8,345,889 B2* | 1/2013 | Li | ................. | A47B 37/04 381/77 |
| 8,444,104 B2* | 5/2013 | Li | ................. | A45B 3/04 135/16 |
| 8,453,659 B2* | 6/2013 | Li | ................. | A45B 3/00 135/16 |
| 8,795,023 B2* | 8/2014 | Elson | ................. | A63H 33/006 446/227 |
| 2003/0167698 A1* | 9/2003 | Adams | ................. | E04H 15/18 52/6 |
| 2005/0048865 A1* | 3/2005 | Zheng | ................. | A63B 9/00 446/91 |
| 2007/0240746 A1* | 10/2007 | Chen | ................. | E04H 15/322 135/119 |
| 2011/0005560 A1* | 1/2011 | Nair | ................. | E04H 15/14 135/96 |
| 2012/0021872 A1* | 1/2012 | Saha | ................. | A63B 69/0053 482/8 |
| 2014/0038678 A1* | 2/2014 | Chen | ................. | A63B 69/0053 463/7 |
| 2014/0096805 A1* | 4/2014 | Silva | ................. | E04H 15/10 135/91 |
| 2016/0192783 A1* | 7/2016 | Kelly | ................. | A63B 63/00 135/96 |

* cited by examiner

INTEGRATED SHADE-PROVIDING STRUCTURE AND ELECTRONIC GAME

BACKGROUND

The present disclosure generally relates to an integrated shade-providing structure and electronic game.

Shade-providing structures on lands reserved for recreation provide significant benefits by providing members of the public with a space that is sheltered from the heat and UV-rays of the sun. Children, however, may find such spaces relatively boring compared to playground structures often located nearby. The present invention overcomes this disadvantage by incorporating an electronic game into the supporting framework of the shade-providing structure. Because the game may be configured to encourage children to run around between various game elements, the present invention may also provide the additional advantage of promoting physical activity within the relatively cool, shaded area underneath the shade-providing canopy.

SUMMARY

Embodiments of the present disclosure are directed to a shade-providing structure comprising a framework supporting one or more canopy elements and having an electronic game incorporated with the framework. The framework may generally include a plurality of uprights, a plurality of support beams, and a central hub. The plurality of uprights may be spaced apart from one another to define a central space located underneath the shade-providing canopy element(s). The distal ends of the support beams may generally be attached to the upper ends of the uprights and each support beam may extend toward the center of the framework. The proximal ends of the support beams may be attached to the central hub, which is located in the center of the framework. One or more canopy elements may be mounted to the framework, and more particularly to one or more of the support beams, in order to provide an elevated canopy producing a shaded space below.

The structure also includes a game system comprising a plurality of electronic game units mounted to the plurality of uprights. The game units are operably connected to one another, such as by wires that extend through the framework and connect together within the central hub. At least one of the game units may be a control unit. At least one of the game units, and optionally a plurality of the game units, may include an indicator, a touch sensor, or both. The indicator may comprise, for example, a visual indicator, such as an LED light or series of LED lights, a video screen, or the like; an audible indicator, such as a speaker configured to produce a sound, a bell or chime, or the like; or a combination thereof. The touch sensor may include any element configured to register that a user has touched the game unit, such as one or more sensors, touchscreens, buttons or other depressible elements, levers, or the like.

The game system may also include a battery cell, which may desirably be incorporated within one or more of the game units. In some embodiments, for example, each of the one or more control units may comprise a battery cell. The battery cell may be configured to maintain a charge over time. For instance, the battery cell may be operably connected to one or more solar panels, which may be affixed to or incorporated within the structure. In other embodiments, however, the structure, and desirably the control unit, may also include a component configured to charge the battery cell. For instance, the structure, and desirably the control unit, may include a physically-manipulatable component that is operably connected to the battery cell such that a user may charge the battery cell by physically manipulating the component. Examples of such manipulatable components include a rotating wheel, a hand crank, a foot pump, a pedal (e.g. bicycle or hand-pedal) device, a step (e.g. elliptical or stair-climbing) device, combinations thereof, etc. Alternatively, the structure may simply be hard-wired to a source of electricity.

The game system, and desirably the control panel, may include one or more input elements, one or more output elements, or both. A user may initiate a gaming session, for instance, through any of a variety of interactions with the one or more input elements. This may involve, for example, use of a touchscreen or touch sensor, pressing one or more buttons, flipping one or more switches, voice activation, etc. In some embodiments, the game system may be configured so that a user may also use one or more input elements to select from a plurality of different games. An output element may provide instructions to the user on how to play a game, feedback to the user on the results of the game, etc. The output elements may include, for example, a video screen (note that this may be a touchscreen that operates as the input element as well), a speaker, etc. The control panel may also comprise a processor, which may be operably connected to any input elements, output elements, or both, on the control panel. In some embodiments, the game system (and more specifically the processor) may be configured to communicate with a user's personal electronic devices, such as a smart phone or tablet computer. Accordingly, one or more input and/or output functions may be performed using the input and/or output elements of the personal electronic device instead of through the use of such elements on the control panel.

The game system may be configured to provide one game or more than one game. The type and variety of games that can be provided using the game system described herein is vast. In some embodiments, a program for a personal electronic or computing device, e.g. an "app", may be connectable with the gaming system such that one or more programs or games programmed into an "app" may be operated by the gaming system. This would allow for the updating of available games without any need to physically access the gaming system itself. By making games available to users through a program or "app," it would also allow the gaming system to offer an updatable and changing library of games.

In one example game, for instance, initiation of a gaming session may activate the indicator of one of the plurality of gaming units. A user may deactivate the indicator of the game unit by making contact with the touch sensor of that game unit. When the user deactivates that game unit, however, the indicator of a different game unit may become activated. The sequence of which game units are activated may be random or it may be programmed to a predetermined or user-selected difficulty level. The game session may be configured to run for a predetermined time, during which a user will try to deactivate as many different game units as possible. At the end of the gaming session, the output element may identify the number of game units deactivated during the session.

In another example game, for instance, initiation of a gaming session may activate the indicators of the game units in a sequence, thereby defining a target sequence. A user may then be prompted to make contact with the touch sensors of the game units in the target sequence. The sequence may be random or it may be programmed to a predetermined or user-selected difficulty level. The output element may identify whether a user has made contact with the game units in the target sequence. In some embodiments, the gaming session may be iterative, with an additional number of activations being added to the target sequence until the user fails to make contact with the game units in that sequence.

Other games, not described in detail herein, may make use of only the indicators on each game unit or of only the sensor on each game unit. Various display and/or input steps may also or alternatively be performed on the control panel. In many embodiments, however, it is desirable that the game causes a user to move between the various game units, in order to promote physical activity. Many of the games, including those described above for example, may also promote cooperative play among a group of children.

In order to facilitate installation, repair, and/or a replacement of parts, the central hub may comprise a hollow interior in which the wire or wires coming from each game unit may be connected. To render that interior space easily-accessible, the central hub may comprise a body and a removable cover. In some embodiments, for instance, the underside of the hub may comprise a removable cover that may be secured to the body by one or more fasteners, e.g. screws, bolts, or the like.

In other embodiments, the game units may wirelessly communicate with one another, such that no wiring is necessary.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION

Figure 1:
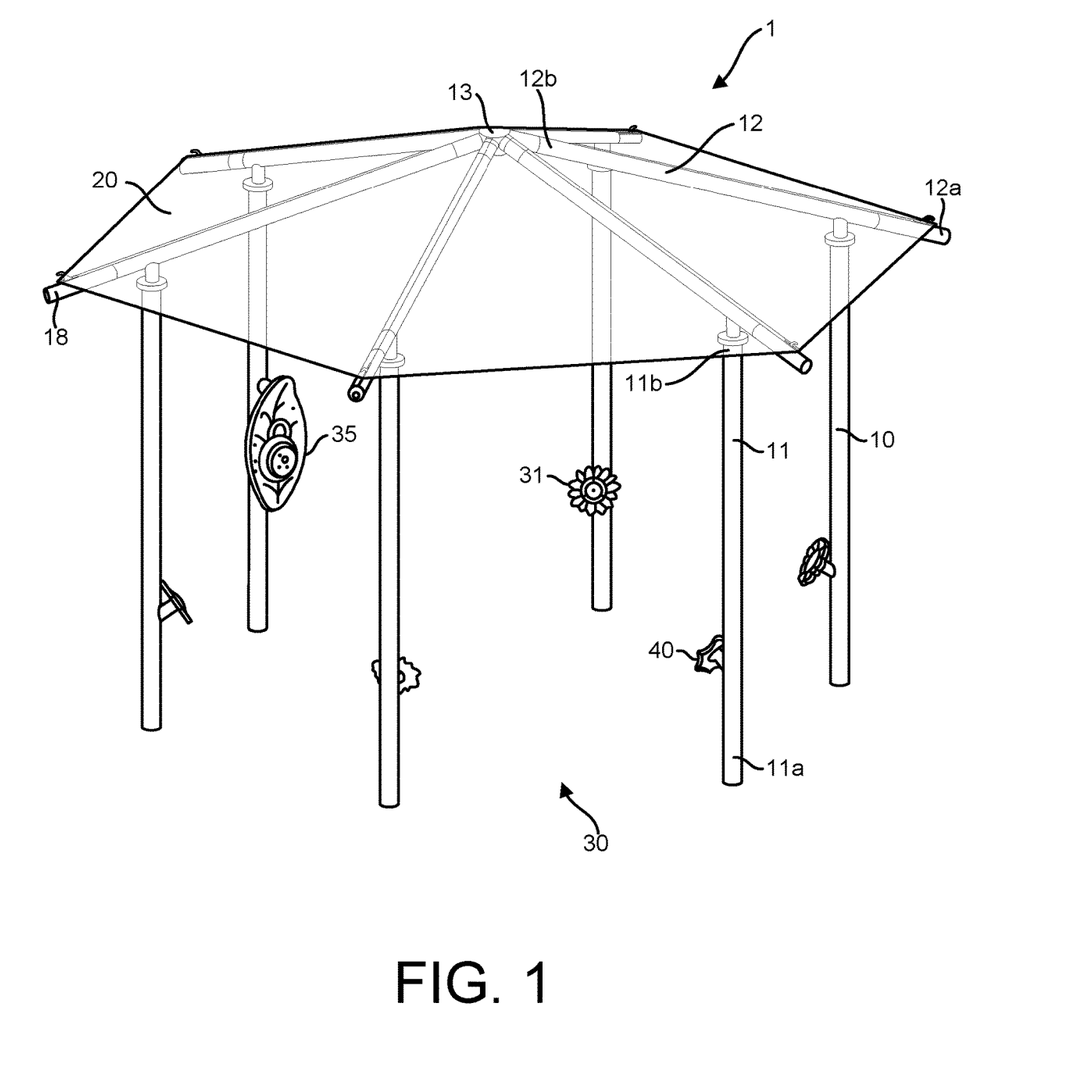
FIG. 1 is a perspective view of an embodiment of an integrated shade-providing structure and electronic game.

Embodiments of the present disclosure are directed to shade-providing structures 1 having a gaming system integrated therein. An example of such a structure 1 is shown in FIG. 1. As shown, the structure may comprise a framework 10, one or more canopy elements 20, and a game system 30.

The framework may comprise a plurality of uprights 11, a plurality of support beams 12, and a central hub 13. Each upright has a lower end 11a and an upper end 11b. The lower end 11a may be mounted to a ground surface in any number of conventional ways. The upper end 11b may be located a desired height above the ground surface. As shown in FIG. 1, the uprights 11 may be arranged to define a circular or polygonal central space. In other (non-illustrated) embodiments, however, the uprights 11 may be arranged only along one side, thereby defining a shaded space having a large entrance opening on the opposite side. Other arrangements of the uprights 11 are also contemplated without departing from the scope of the invention. The upper end 11b of each upright may be connected to one of the plurality of support beams 12.

Each support beam 12 has a distal end 12a and a proximal end 12b. Each support beam 12 is desirably connected to an upright 11 at or near its distal end 12a. The connection may be by any conventional means, including for example fasteners (e.g. bolts, screws, or the like), welding, etc. Each support beam 12 extends from the upright toward a convergence point, which in the embodiment shown in the Figures is at a central location. The support beams 12 may be oriented to provide the desired canopy shape. In the illustrated embodiment, for example, the support beams 12 are angled upward, away from the ground surface. The proximal end 12b of each support beam is connected to the central hub 13, also sometimes referred to as the apex joint.

Figure 2:
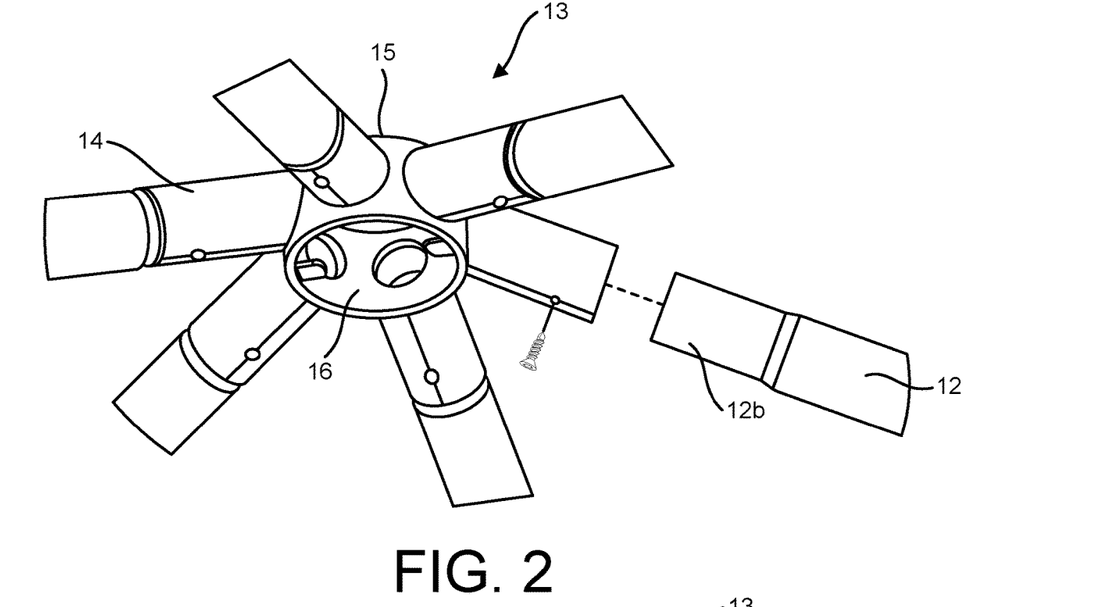
FIG. 2 is a perspective view showing the connections between a central hub and a plurality of support beams in an embodiment of an integrated shade-providing structure and electronic game.
Figure 3:
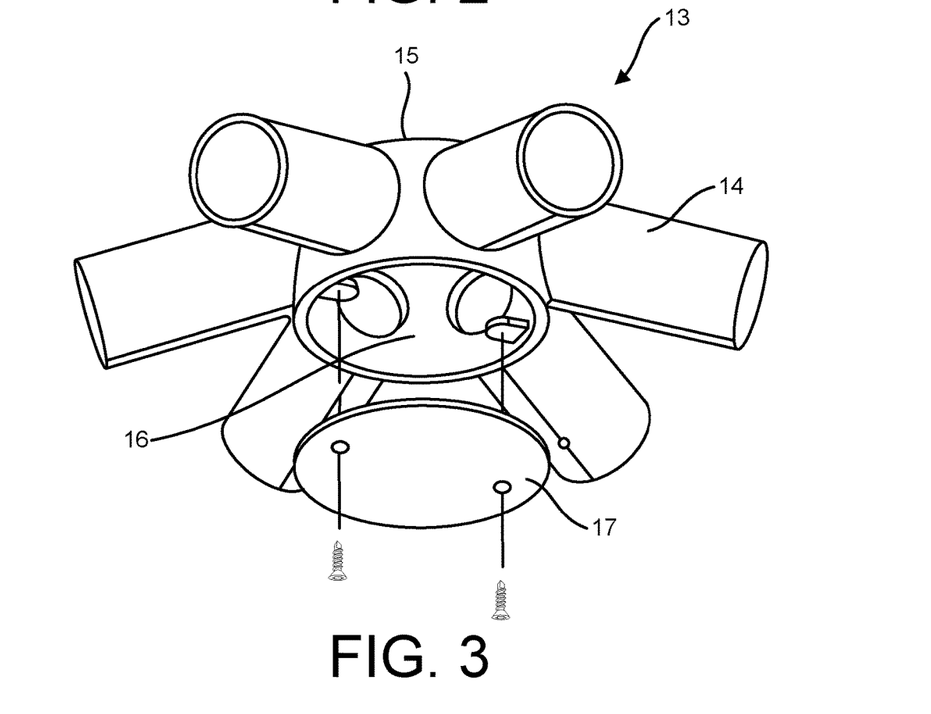
FIG. 3 is a perspective view showing the interior space of a central hub in an embodiment of an integrated shade-providing structure and electronic game.

The central hub 13 may take on any of a variety of configurations, so long as it secures the proximal ends 12b of the support beams in a suitable manner to support the canopy 20. An embodiment of a central hub 13 designed specifically for an embodiment of the structure disclosed herein is shown in FIGS. 2 and 3. In some embodiments, including that shown in FIG. 1, each of the uprights 11 and support beams 12 may be pipes, e.g. hollow metal tubes (at least the outer surface of which may be treated to provide protection from the environment using known methods). The central hub 13 may therefore have a plurality of tube-receiving arms 14, the number of tube-receiving arms generally being the same as the number of support beams 12. As shown, each tube-receiving arm 14 may be angled at generally the same angle of the support beams 12. The tube-receiving arms 14 extend from the central hub body 15. As illustrated in FIG. 2, each tube-receiving arm 14 may be configured to receive the proximal end 12b of a support beam and may include one or more apertures configured to receive one or more locking fasteners. Although the central hub body 15 of the illustrated embodiment is circular, other shapes may easily be provided.

Notably, the central hub 13 may define an interior space 16, which may be accessible through a relatively-large opening. As shown in FIGS. 2 and 3, for example, the central hub body 15 may have an open end, such as an open underside, through which the interior space 16 may be accessed. The open end may be closed off with a removable cover 17, such as a cover plate. The removable cover 17 may be secured to the body 15 through any conventional manner, including a snap-fit, a friction fit, one or more interlocking elements, mating screw-threads, fasteners such as screws or bolts, or combinations thereof. In the embodiment illustrated in FIG. 3, for example, the cover 17 is secured to the central hub body 15 through the use of a pair of screws. As shown in FIGS. 2 and 3, the interior space 16 is also open to each tube-receiving arm 14, such that wiring from each game unit may pass from the interior of the support beam 12, through the associated tube-receiving arm 14, and into the interior space 16 of the central hub 13.

The framework 10 may also comprise one or more tensioning devices 18, which are configured for an installer to provide the one or more canopy elements with a desired degree of tautness. In some embodiments, for example, a tensioning device 18 may be mounted to the distal end 12a of one or more of the support beams 12. An example of such a tensioning device is described in U.S. Pat. No. 8,991,413, the entirety of which is incorporated by reference herein. In the embodiment illustrated in FIG. 1, for example, the distal end 12a of each support beam 12 comprises a tensioning device 18. This allows an installer with a maximum capability to achieve the desired tautness across each section of a single canopy, as in the illustrated embodiment, or across each distinct canopy element.

Figure 4:
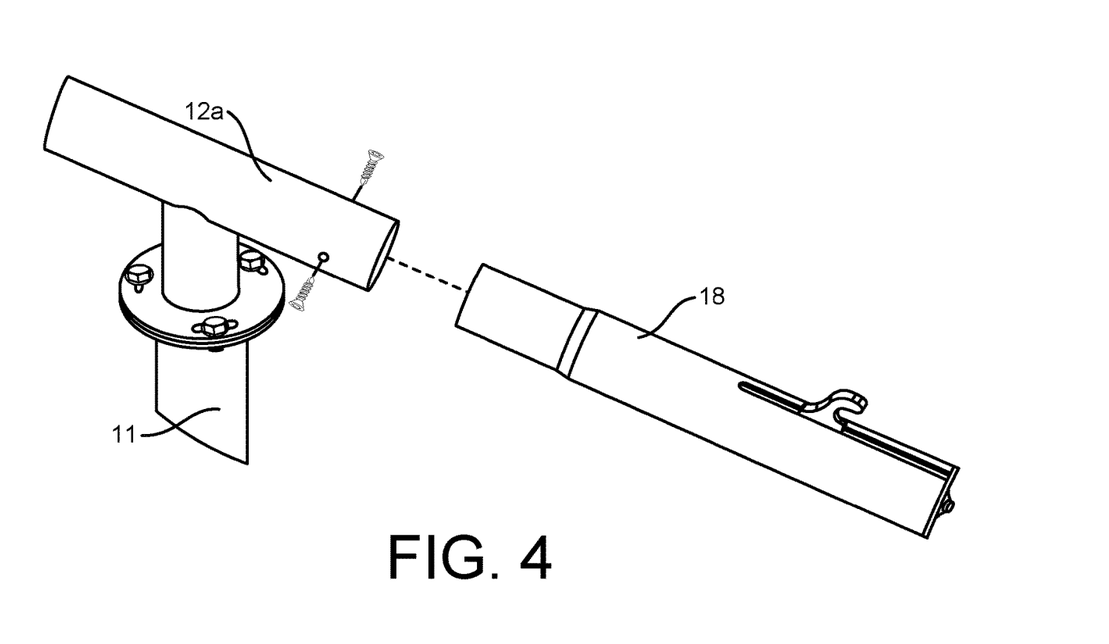
FIG. 4 is a perspective view showing a tensioning device mounted on the distal end of a support beam in an embodiment of an integrated shade-providing structure and electronic game.
Figure 5:
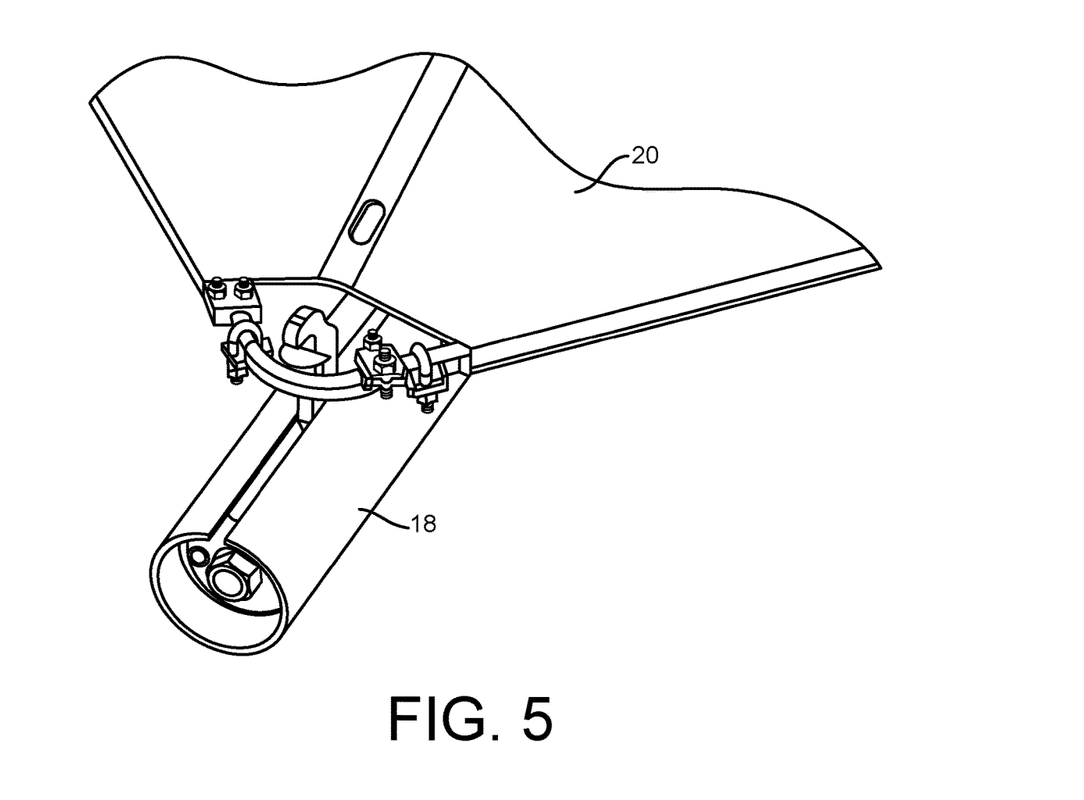
FIG. 5 is a perspective view showing the tensioning of a canopy using a tensioning device mounted on the distal end of a support beam in an embodiment of an integrated shade-providing structure and electronic game.

The tensioning device 18 may be mounted to the distal end 12a of the support beam 12 in any conventional manner, including by welding or through the use of one or more fasteners. In the embodiment illustrated in FIG. 4, for example, the tensioning device 18 is inserted into an opening in the distal end 12a of the support beam. The distal end 12a of the support beam comprises one or more apertures configured to receive one or more locking fasteners, which secure the tensioning device 18 in place. As shown in FIG. 5, the tensioning device 18 may include a hook that catches a canopy framework or an opening in the canopy (e.g. an eyelet, loop, etc.). The hook may be movable along the longitudinal axis of the support beam 12 in order to either tighten or loosen the canopy 20, so as to provide the canopy with a desired degree of tension. For instance, the hook may extend from a longitudinal slot of the tensioning device 18 and may be secured to an internal threaded shaft in a manner such that rotation of the internal shaft, e.g., by engagement of a tool with the head of the shaft which may be exposed at the end of the tensioning device, causes the hook to move longitudinally.

Wires 19 may be used to connect various elements of the electronic game and the wires may be enclosed by the framework 10. In some embodiments, for instance, the framework 10 may be made of substantially hollow components, e.g. piped uprights 11 and piped support beams 12. In this way, one or more wires 19, which may be jacketed to form one or more cables, may extend through the internal passages of the one or more of the uprights 11 and support beams 12. In some embodiments, including that illustrated in FIG. 1 for example, one or more wires 19 may extend through the internal passages of each upright 11 and each support beam 12. A first end of each wire 19 may be connected to a game unit 31, which is mounted to one of the uprights 11. A second end of each wire 19 may be connected to a wire junction positioned within the interior space 16 of the central hub 13. Because the interior space 16 of the central hub 13 may be accessed by removing the cover plate 17 located on the underside of the central hub body 15, the wires 19 and the wire junction may be easily accessible during installation or if repairs or replacements are needed.

Figure 6:
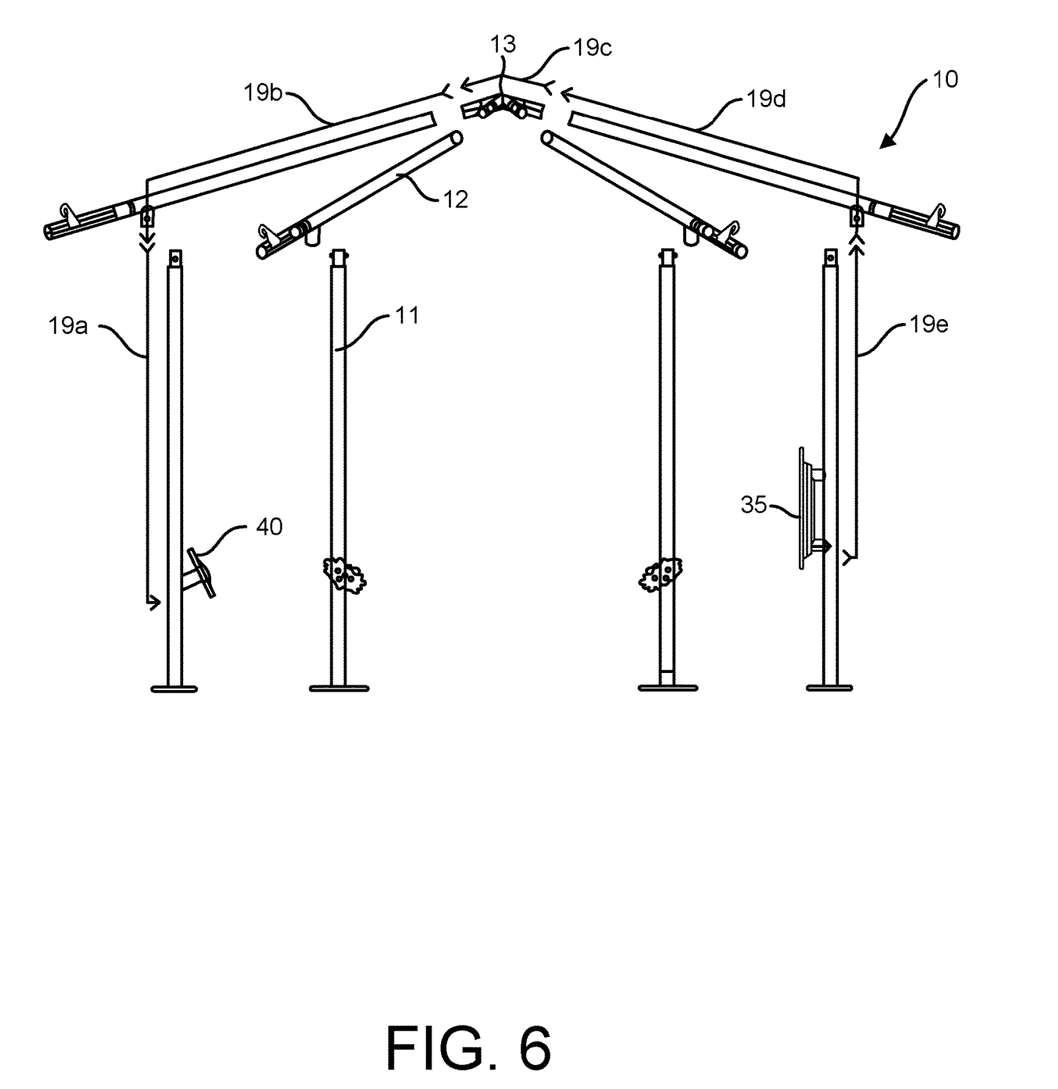
FIG. 6 is an exploded, side elevation view of a framework for an embodiment of an integrated shade-providing structure and electronic game, showing wiring between game units enclosed within the framework.

An example of such a wiring scheme is shown in FIG. 6. In the illustrated embodiment, the wiring comprises a first cable (i.e. set of wires) 19a that extends from a gaming unit 31 into the hollow enclosure of an upright 11 and through to the upper end 11b of the upright. Where the upper end 11b of the upright is connected to a support beam 12, the first cable 19a may be operatively connected to a second cable 19b, which extends into the hollow enclosure of the support beam 12 and through to the proximal end 12b of the support beam. Where the proximal end support beam 12b is connected to the central hub 13 (or within an interior space 16 of the central hub if present) the second cable 19b may be operatively connected to either a wiring manifold or a third cable 19c which is operatively connected to a wiring manifold.

Figure 8:
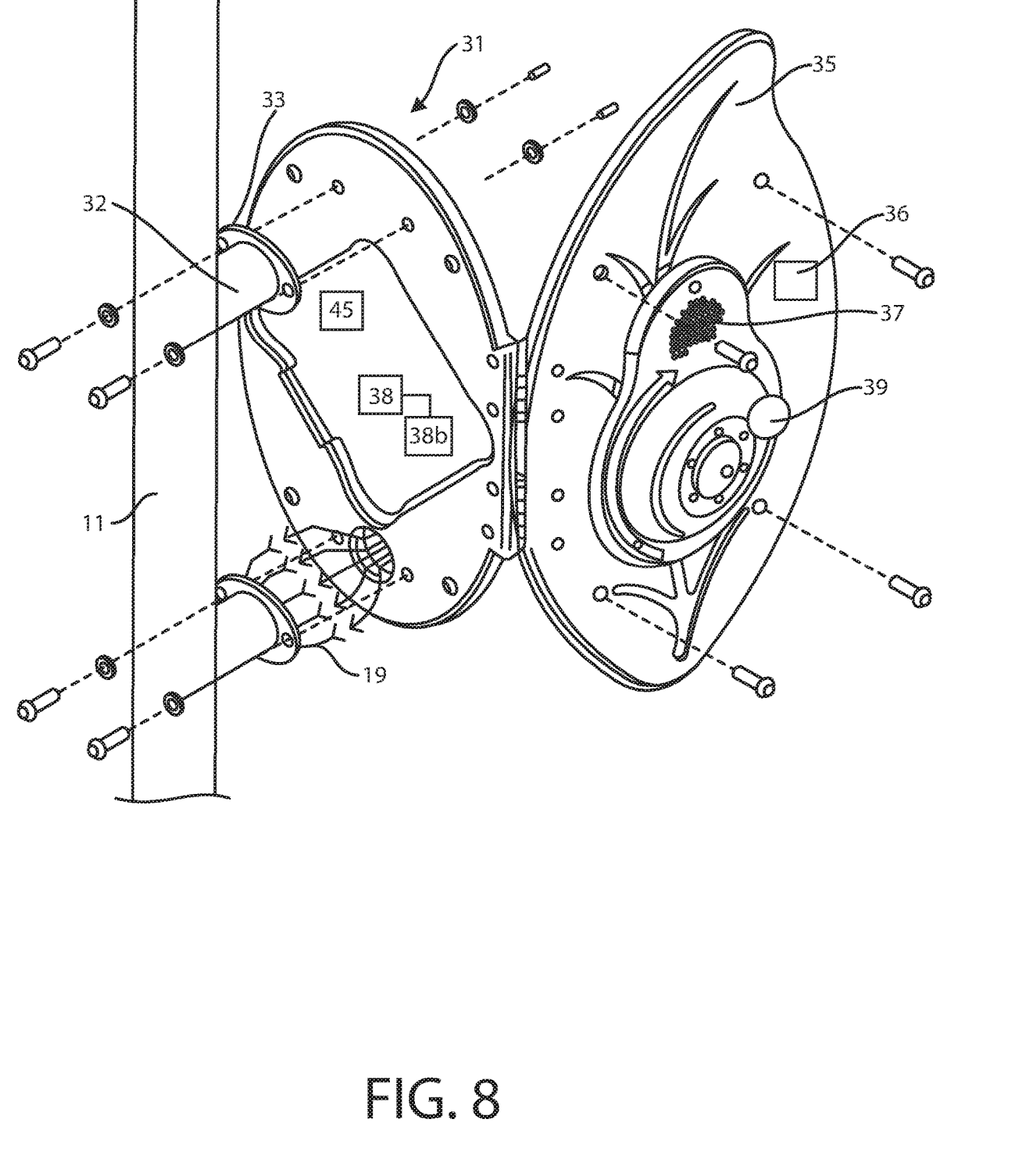
FIG. 8 is a perspective view showing the mounting of a game unit, and specifically a control unit, to the framework in an embodiment of an integrated shade-providing structure and electronic game.

In some embodiments, pre-installed wiring through the upright 11 and support beam 12 that are configured to hold the control panel 35 may include a plurality of wires or cables that terminate in the wiring manifold described above. In other words, the second cable 19b or third cable 19c from a particular auxiliary unit 40 may be operatively connected to one of a plurality of further cables 19d at the wiring manifold. Cable 19d may span through the support beam 12 positioned above the control panel 35, and may be operatively connected to one of a plurality of further cables 19e, which span through the upright 11 to which the control panel 35 is mounted. Cable 19e may then be operatively connected with the control panel 35, such as is shown in FIG. 8. Alternative wiring schemes are also envisioned and would be readily obtainable by one of skill in the art.

The framework 10 supports a canopy 20. The canopy 20 is configured and positioned to block the sun's rays, thereby providing a shaded area. In many embodiments, including that shown in FIG. 1, the canopy 20 may be positioned and oriented to provide a shaded area substantially underneath the canopy 20. In other embodiments, the canopy 20 may be positioned and oriented, e.g. angled, to provide a shaded area at another defined location. The canopy 20 may be made up of either a single canopy element or a plurality of distinct canopy elements. Each canopy element may be made out of any of a variety of materials and fabrics, as would be understood by those of skill in the art. The canopy 20 may have any of a variety of shapes, including circular or rounded, polygonal, themed, or the like. In the illustrated embodiment, the canopy 20 comprises a single canopy element having a hexagonal shape. As shown, each side of the hexagonal canopy 20 spans between adjacent uprights 11 and each corner of the hexagon is attached to the tensioning element 18 located at the distal end 12a of each support beam 12. Accordingly, each section of the canopy 20 can be independently tensioned.

The integrated shade-providing and gaming structure 1 also comprises one or more gaming systems 30. The gaming system 30 comprises a plurality of game units 31. Each game unit 31 may be mounted to one of the uprights 11. The game units 31 may be mounted to the uprights 11 in any of a variety of ways.

Figure 7:
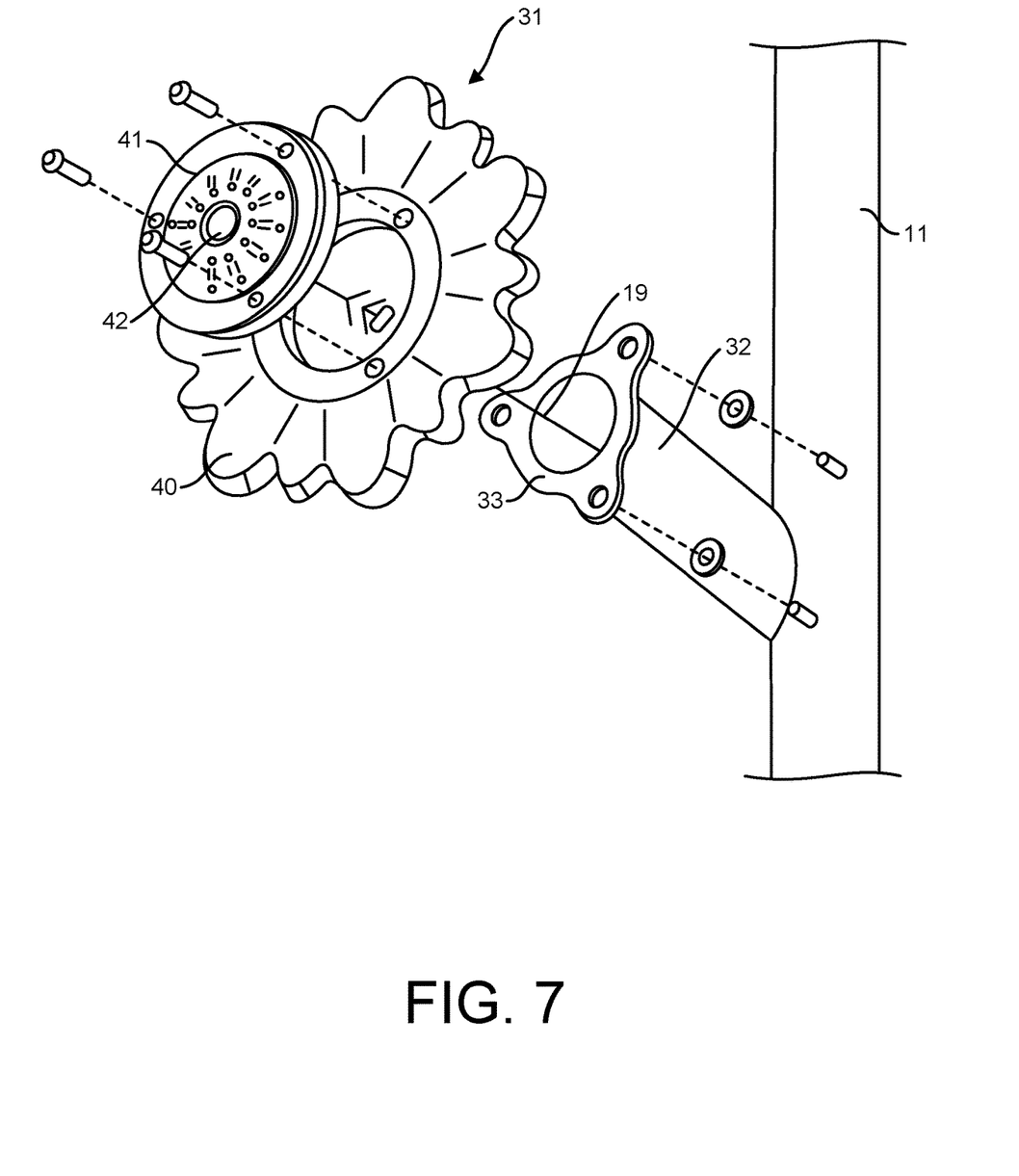
FIG. 7 is a perspective view showing the mounting of a game unit, and specifically an auxiliary game unit, to the framework in an embodiment of an integrated shade-providing structure and electronic game.

In some embodiments, the upright 11 may comprise an extended element 32 that defines a mounting flange 33, such as is shown in FIGS. 7 and 8. The extended element 32 may be an integral part of the upright 11 or it may be attached to the upright, such as through welding. The extended element 32 may be a hollow piped member having a central passage that links up with the central passage of the upright 11 so that one or more wires 19 can extend through both the upright 11 and the extended element 32, such that the wire(s) can be connected to the game unit 31 and remain fully concealed from users.

The mounting flange 33 may have one or more through-holes, configured to receive one or more fasteners. The game unit 31 may also have one or more through-holes which are positioned to align with the one or more through-holes of the mounting flange 33 when the game unit is in the proper orientation. Accordingly, the game unit 31 may easily be mounted to the flange 33 by passing one or more fasteners, e.g. bolts, through the aligned through-holes and securing the fasteners in place. For increased security, the one or more fasteners may be tamper-proof and/or require a special tool to remove. As shown in FIG. 8, for example, depending on the size of the game unit 31, the upright 11 may comprise a plurality of extended elements 32, such that the game unit can be supported at multiple locations. In other, non-illustrated embodiments, the upright 11 may simply have an opening through which the wire(s) 19 may be accessed and the game unit 31 may be mounted directly to the upright (preferably so as to cover or conceal the opening) by other means, such as clamps or the like.

In some embodiments, the uprights 11 and support beams 12 may be pre-wired. In embodiments, including where the framework elements 10 are pre-wired, a wire or cable 19, e.g. as is described above with respect to FIG. 6, may span through the extended element 32, where it can be operatively connected to the auxiliary game unit 40, as shown for example in FIG. 7. Similarly, a plurality of wires or cables 19 may span through an extended element 32 to be operatively connected to the control panel 35, as shown for example in FIG. 8.

The game units 31 may be mounted at a height that is optimal for the gaming experience. Generally, the game units 31 may be mounted between about 2 feet and about 4 feet above the ground.

The game units 31 may comprise one or more control units 35. The control unit may include any number of components, such as at least one input device 36, at least one output device 37, or both. The input device 36 may comprise, for example, any one or more of a touchscreen, a touch sensor or touchpad, a keypad, a joystick, a directional pad, a button or set of buttons, a switch or set of switches, a microphone enabling voice activation software, etc. The output device 37 may comprise, for example, any one or more of a video screen (this may also be a touchscreen), a speaker, an LED light or series of LED lights, etc.

The control unit 35 may also comprise one or more processors 38 configured to accept information from the one or more input devices 36, run one or more programs, and convey information to the one or more output devices 37. For example, the control unit 35 may include a relatively simple CPU circuit board, e.g. one comprising one or more memory elements 38b in addition to the one or more processors 38.

The gaming system 30 may also comprise one or more battery cells 45. For instance, each gaming unit 31 may comprise a battery cell or, more desirably, the control panel 35 may comprise a battery cell 45 that is configured to power all of the game units 31 (e.g. through the wired connections 19 between the units). In some embodiments, the battery cell 45 may have a long lifespan and/or may be recharged by environmental factors. For instance, the battery cell 45 could be operably connected to one or more solar panels, which may be affixed to or incorporated into the structure 1.

In some embodiments, however, the gaming system 30 may also comprise a component 39 that may be physically manipulated to charge the battery cell. For instance, the control unit 35 may include a component 39 that may be physically manipulated in order to charge the battery cell. Examples of such components 39 include a rotating wheel, a hand crank, a foot pump, a pedal (e.g. bicycle or handpedal) device, a step (e.g. elliptical or stair-climbing) device, combinations thereof, etc. The control unit 35 illustrated in FIG. 8, for example, comprises a rotational generator component 39 that is manually rotated in order to charge the battery cell.

In other embodiments, the gaming system 30 may simply be hard-wired to a source of electricity.

The game units 31 may also comprise one or more auxiliary game units 40. The auxiliary game units 40 may include an indicator 41, a touch sensor 42, or both. The indicator 41 may comprise, for example, a visual indicator, such as an LED light or series of LED lights, a video screen, or the like; an audible indicator, such as a speaker configured to produce a sound, a bell or chime, or the like; or a combination thereof. The touch sensor 42 may include any element configured to register that a user has touched the game unit, such as one or more sensors, touchpads, touchscreens, buttons or other depressible elements, levers, or the like.

Data may be freely conveyed from the processor 38 contained within the control unit 35 to the auxiliary game units 40 and from the auxiliary game units to the processor. For instance, instructions from the processor 38 may be conveyed to the auxiliary game units 40 in order to activate the indicator 41. Similarly, data associated with a user contacting the touch sensor 42 may be conveyed to the processor 38. One or more of the auxiliary game units 40 may also comprise its own processor, memory, etc. The information may be conveyed between the control unit 35 and the auxiliary units 40 through wires 19 that may be integrated into the framework 10 as described herein. In other embodiments, however, the information may be conveyed between the control unit 35 and the auxiliary units 40 using wireless technology, such as WiFi, Bluetooth©, or the like.

In some embodiments, the gaming system 30 may comprise at least one control unit 35 and at least one (and optionally a plurality) of auxiliary units 40. In some embodiments, two or more of a plurality of auxiliary game units 40 may be the same or substantially the same. In the illustrated embodiment, for instance, all of the auxiliary units 40 are substantially the same. In other embodiments, one or more of the auxiliary units 40 may be distinct from other auxiliary units. For instance, each auxiliary unit 40 could be distinct. Moreover, while the gaming system 30 of the illustrated embodiment has only a single control unit 35, other embodiments may include multiple control units 35. For example, a gaming system 30 could comprise multiple control units 35 that operate independently and provide a user with different game experiences. Alternatively, multiple control units 35 could operate in conjunction with one another to provide a more complex gaming experience.

Each of the game units 31 is desirably configured to withstand outdoor environmental conditions as well as repeated use by children. The design of each unit and the materials used for each unit are therefore selected with those factors in mind. Moreover, one or more of the game units 31 may also be provided with drainage holes to prevent damage from rain and/or snow.

In some embodiments, each of the game units 31 may also be designed to fit within a desired theme. The game units 31 of the illustrated example, for instance, are designed in the shape of leaves and flowers. A theme can be selected to match that of a nearby play structures or to relate to nearby recreational activities, e.g. animal-themed game units 31 may be desirable where the structure 1 is to be located in or near a zoo.

The gaming system 30 can be configured to provide one game or a plurality of games, i.e. more than one different game. In some embodiments, for instance, a user may select one of a variety of different games using one or more input elements 36 on the control panel 35. In some embodiments, the gaming system 30 may provide a game that is initiated by a user charging the battery cell, such as by rotating the wheel 39 provided on the control unit 35 in the illustrated embodiment, which is configured to manually charge the battery cell. Once the battery cell is fully charged, a speaker 37 on the control unit may play a recorded voice that provides game play instructions and/or prompts the user(s) with a countdown that the game is about to begin.

In one example game, once the game begins an indicator 41 on one (or more than one) of the auxiliary gaming units 40 is activated. In the illustrated embodiment, for instance, a series of LED lights 41 may illuminate in a spiral pattern, so as to easily draw the user's attention. The user must move to the activated auxiliary unit 40 and deactivate the unit by interacting with the touch sensor 42. In the illustrated embodiment, this may be achieved by tapping the central metal disk of the auxiliary unit 40. When the contacted gaming unit 40 is deactivated, an indicator 41 on a different auxiliary gaming unit (which is attached to a different upright 11) is activated. The user must then move to that newly activated gaming unit 40 so as to deactivate it, thereby triggering the activation of yet another gaming unit.

The game session may be configured to run for a predetermined time, during which the user (or group of users) will move between the various gaming units 40 mounted to the framework 10 of the shade-providing structure 1. At the end of the game session, the control panel 35 may identify to the user(s) the number of auxiliary units 40 that the user was able to deactivate within the game session. For instance, the speaker 37 on the control unit may play a recorded voice that identifies the number of auxiliary units 40 that were deactivated during the game session.

The sequence in which game units 40 are activated may be random. In other embodiments, however, the sequence may be programmed to a predetermined or user-selected difficulty level. For instance, a user could select a difficulty level using one or more input elements 36 of the control panel 35. Each game session may last for the same or substantially the same amount of time. Alternatively, a user may select a game length from a number of options. For instance, a user could select a game length using one or more input elements 36 of the control panel 35.

In another example game, initiation of a gaming session may activate the indicators 41 of the auxiliary game units 40 in a sequence, thereby defining a target sequence. A user may then be prompted to make contact with the touch sensors 42 of the game units 40 in the target sequence. The sequence may be random or it may be programmed to a predetermined or user-selected difficulty level. The output element 37 of the control panel 35 may identify whether a user has made contact with the game units 40 in the target sequence. If a user has made contact with the game units 40 in the target sequence, then a user may be provided with a new target sequence. In some embodiments, the target sequence may increase iteratively. For instance, the initial target sequence may be a series of four activations. If the user contacts the game units 40 in the correct sequence, the next target sequence may be a series of five activations. The series of five activations may include the same previous series of four activations plus a new activation. In this way, the target sequence may continue to increase in number until the user fails to make contact with the game units 40 in the correct sequence. When that occurs, a recorded voice may identify the number of activations in the last target sequence that was correctly satisfied by the user.

As can be seen from the above disclosure, a variety of different games may be performed using the control panel 35 and auxiliary game units 40 described herein. For instance, other games, not described in detail herein, may make use of only the indicators 41 on each game unit 40 or of only the sensor 42 on each game unit. Various display and/or input steps may also or alternatively be performed on the control panel 35 or on a personal electronic device that communicates with the gaming system 30.

In many embodiments it is desirable that the game causes a user or a group of users to move between the various game units 31 in order to promote physical activity. Many of the games, including those described above for example, may also promote cooperative play among a group of children.

It can be seen that the described embodiments provide unique and novel shade-providing structures having a number of advantages over those in the art. While there is described herein certain specific elements embodying the invention, it will be manifest to those skilled in the art that various modifications and rearrangements of the elements may be made without departing from the spirit and scope of the underlying inventive concept and that the same is not limited to the particular forms herein shown and described except insofar as indicated by the scope of the appended claims.

What is claimed:

1. A shade-providing structure comprising:
   a framework comprising a plurality of uprights, a plurality of support beams, and a central hub;
   one or more canopy elements secured to the plurality of support beams;
   a game system comprising a plurality of electronic game units mounted to the plurality of uprights, the game units being operably connected to one another by wires that extend through the framework, and
   the game system provides a game that stimulates one or more users to move between the plurality of electronic game units, and thus between the plurality of uprights;
   wherein the plurality of uprights are configured to be mounted to a ground surface such that the shade-providing structure is installed in an outdoor recreational area.

2. The structure of claim 1, wherein at least one of the plurality of electronic game units is a control unit that comprises
   a. a processor, and
   b. at least one input device, at least one output device, or a combination thereof.

3. The structure of claim 2, wherein the control unit comprises a touchscreen.

4. The structure of claim 2, wherein the control unit further comprises a battery cell.

5. The structure of claim 4, wherein the control unit further comprises a physically-manipulatable component operably connected to the battery cell such that a user may charge the battery cell.

6. The structure of claim 1, wherein at least one of the plurality of electronic game units comprises a touch sensor, an indicator, or both.

7. The structure of claim 6, wherein the indicator comprises a visual indicator, an audible indicator, or a combination thereof.

8. The structure of claim 6, wherein at least one of the plurality of electronic game units comprises both a touch sensor and an indicator.

9. The structure of claim 1, wherein the central hub comprises an accessible interior space and the wires from two or more game units are connected within the interior space.

10. The structure of claim 9, wherein the central hub comprises a hollow body and a removable cover.

11. The structure of claim 10, wherein the removable cover is on an underside of the hollow body.

12. The structure of claim 1, wherein at least the plurality of uprights and the plurality of support beams have wires installed therein, the wires extending through a central cavity of the upright or support beam.

13. The structure of claim 1, wherein the plurality of electronic gaming units are mounted to the plurality of uprights so that no wires are visible on the exterior of the structure.

14. The structure of claim 1, wherein each of the plurality of support beams comprises a tensioning device configured to provide the one or more canopy elements with a desired degree of tension.

15. The structure of claim 14, wherein each of the tensioning devices is located at a distal end of a support beam.

16. The structure of claim 2, wherein the control unit is configured for a user to select from a plurality of games.

17. The structure of claim 1, wherein the game system is configured to communicate with a personal electronic device.

* * * * *